Patented Oct. 20, 1942

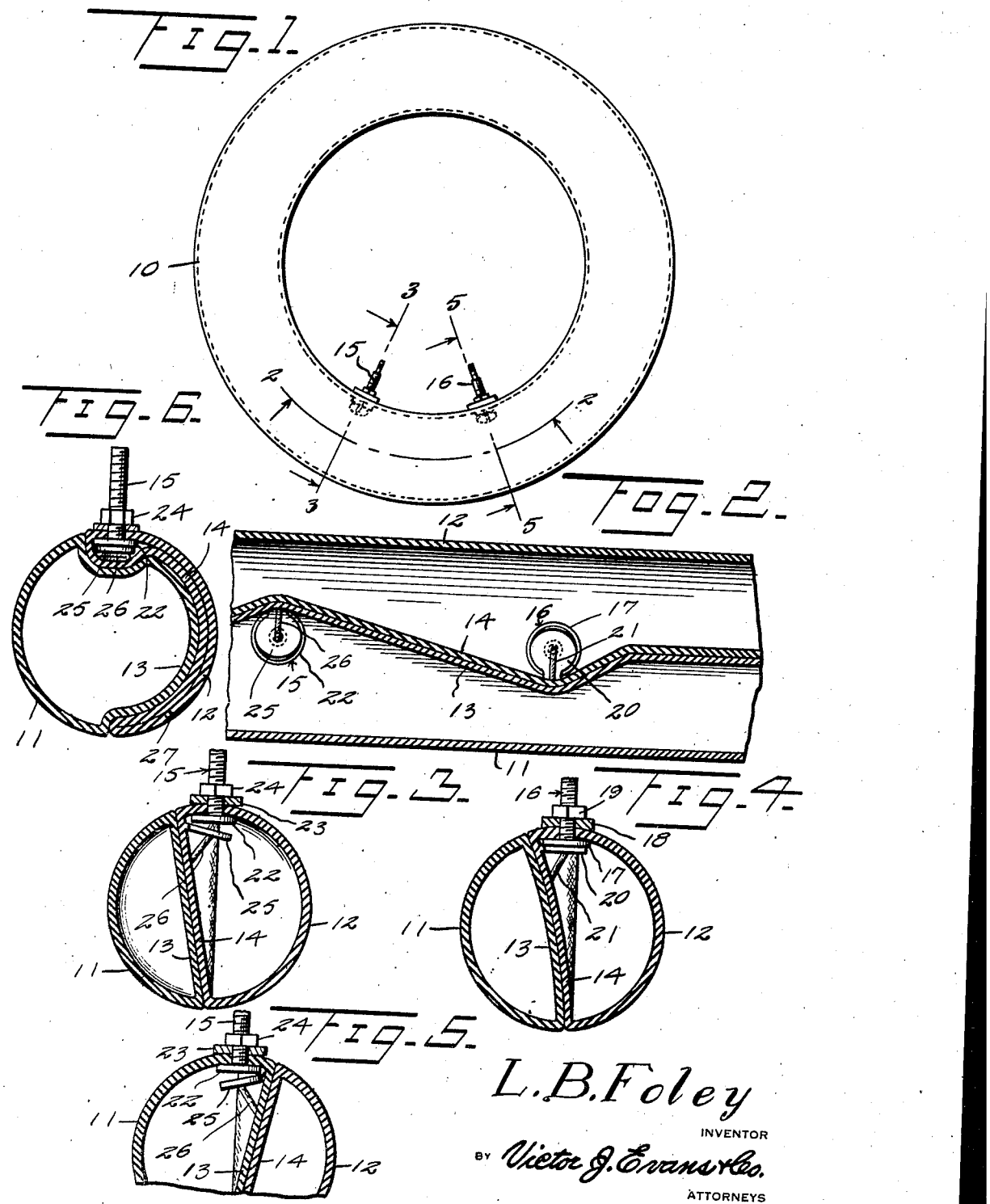

2,299,219

UNITED STATES PATENT OFFICE 2,299,219

TUBE FOR PNEUMATIC TIRE

Leonard B. Foley, Alamosa, Colo.

Application August 11, 1941, Serial No. 406,392

3 Claims. (Cl. 152—340)

My invention relates to pneumatic tubes for vehicle tires, or the like.

An important object of my invention is the provision of a duplex tube for a vehicle tire wherein the total deflating of the entire tube will be prevented in the event of the collapsing of one of the compartments.

Another object of my invention is the provision of a duplex tube for a vehicle tire that will substantially eliminate blowout accidents.

Yet another object of my invention is the provision of a duplex tube for a vehicle tire that will preclude the necessity for changing tires under adverse circumstances and conditions on the open highway.

Still another object of my invention is the provision of a duplex tube for a vehicle tire wherein the collapsing of one of the compartments will leave sufficient air in the tire to permit the driver of the vehicle to proceed to the nearest service station for repairs.

A further object of my invention is the provision of duplex tubes for a vehicle tire that are simple in construction, efficient in operation and inexpensive to manufacture.

Other objects and advantages of my invention will be apparent during the course of the following description.

In the drawing, forming a part of this specification, and in which like numerals are employed to designate like parts throughout the same:

Figure 1 is a front elevation of a device embodying my invention,

Fig. 2 is a fragmentary sectional view, taken on the line 2—2 of Fig. 1,

Fig. 3 is a transverse sectional view, taken on the line 3—3 of Fig. 1, and showing the valve closing means in an open position, Fig. 4 is a transverse sectional view similar to Fig. 3, but showing the valve closing means in the closed position, Fig. 5 is a transverse sectional view, taken on the line 5—5 of Fig. 1, and Fig. 6 is a view similar to Fig. 3 showing one of the duplex tubes in the fully collapsed position and with the valve connection therefor tightly closed.

In the accompanying drawing, wherein for the purpose of illustration, is shown a preferred embodiment of my invention, the numeral 10 designates the inner tube in its entirety which includes right and left hand sections or compartments 11 and 12 respectively. The sections 11 and 12 are of annular formation in plan and have adjoining walls 13 and 14 which are held in abutting relation to each other when the companion sections are positioned within the vehicle tire (not shown). The adjoining walls 13 and 14 are vertically disposed and extend annularly around the tube substantially medially of the tire except where the valve assemblies 15 and 16 are received in the tubes 11 and 12, respectively, at which points they are deformed laterally to accommodate the said valve assemblies.

As illustrated in Fig. 4, the valve assembly 16 enters the compartment 12 adjacent the wall 14 and is held therein by the circular interior flange 17, exterior flange 18 and locking nut 19. The flexible flap valve 20 is hingedly secured to the wall 14 of the tube 12 and is engageable with the interior flange 17 of the valve assembly. A valve check 21 is angularly disposed and integrally connected to the valve 20 and wall 14, as illustrated in Fig. 4.

The valve 15 is similarly positioned in the compartment 11, entering therein at substantially its top, and being maintained therein by the inner circular flange 22, outer flange 23, and locking nut 24. The flap valve 25 is hingedly secured to the wall 13, and the flexible valve check 26 is angularly positioned between the valve 25 and wall 13.

The operation of my device is as follows:

The valve checks 21 and 26 are adapted to hold the valve plates 20 and 25 in the open position when the air volume in each of the compartments 11 and 12 is exactly the same. In the event, however, that the air volume in one of the compartments is substantially reduced, the air in the other of the compartments will exert sufficient pressure on the walls 13 and 14 to cause the same to bulge or belly outward in a manner to permit the closing of the valve plate in the compartment having the reduced volume. If an attempt is then made to check the air pressure within the compartments 11 and 12, a reading will be obtained from the compartment having the greater air volume due to the fact that the lateral displacement of the walls 13 and 14 of the tubes will pull on the valve plate through the valve limiting means and hold the same in an open position. No reading will be attained from the compartment having the reduced volume due to the fact that lateral displacement of the walls 13 and 14 will relieve the pull on the valve check sufficient to permit the air pressure therein to force the valve plate into closing relation with the valve connection. If the operator is not able to obtain a pressure reading on one of the valve connections he is immediately made aware of the fact that the air volume in the compartment is insufficient and as soon as he is able to obtain a reading from each of the compartments he is assured of the fact that both have the same volume. Thus the construction is such as to enable the operator to determine the relative volumes of air in the two tubes, so that equal volumes may be maintained.

In the event a rupture occurs in one of the compartments, as illustrated at 27 in Fig. 6, the air will be immediately discharged from the compartment through the rupture 27, and the vertical walls 13 and 14 will be displaced laterally in pressed relation with the side of the deflated compartment. The person testing the tubes can easily determine in which of the tubes the rupture has occurred. The valve will close the valve assembly to prevent any air pressure from reaching the gauge in the ruptured tube, and the valve check in the other tube will hold the valve open to permit a reading to be taken thereupon. This will reduce the air pressure in the inflated compartment to one-half, but sufficient air will remain in the compartment to prevent the vehicle from getting out of the driver's control in the event that the rupture occurs while the vehicle is traveling at a high rate of speed, and the air pressure remaining in the tire will be sufficient to hold the rim of the wheel off the ground and prevent the tire from being cut to pieces, thereby permitting the driver of the vehicle to proceed to the nearest service station for repairs.

It is to be understood that the form of my invention herewith shown and described is to be taken as a preferred example of the same, and that various changes in the size, shape and arrangement of parts may be resorted to without departing from the spirit of my invention or the scope of the appended claims.

Having thus described my invention, I claim:

1. In a pneumatic tire, the combination of a first inner tube section, a second inner tube section, said first and second sections being respectively provided with a first wall and a second wall lying in face to face engagement, a valve assembly attached to the first section adjacent said first wall, a valve assembly attached to said second section adjacent said second wall, a flexible flap valve on said first wall normally spaced from said first valve assembly but sealingly engaging the first valve assembly through bending of said first and second walls upon partial deflation of the first section, and a flexible flap valve on said second wall normally spaced from said second valve assembly but initially sealingly engaging said second valve assembly through bending of said first and second walls upon partial deflation of said second section.

2. The invention described in claim 1 wherein the first and second valve assemblies each includes a flange engaging the inner face of its respective section, and a nut means engaging the outer face of the section, and in which said first and second mentioned flap valves sealingly engage the respective flanges of the first and second valve assemblies.

3. The invention described in claim 1 wherein a flexible tie connection is provided between said first mentioned flap valve and said first wall, and in which a flexible tie connection is provided between the second mentioned flap valve and said second wall.

LEONARD B. FOLEY.